Nov. 26, 1935.  A. McL. NICOLSON  2,022,144
LIGHT CONDITIONING AND DISTRIBUTION SYSTEM
Filed May 28, 1932
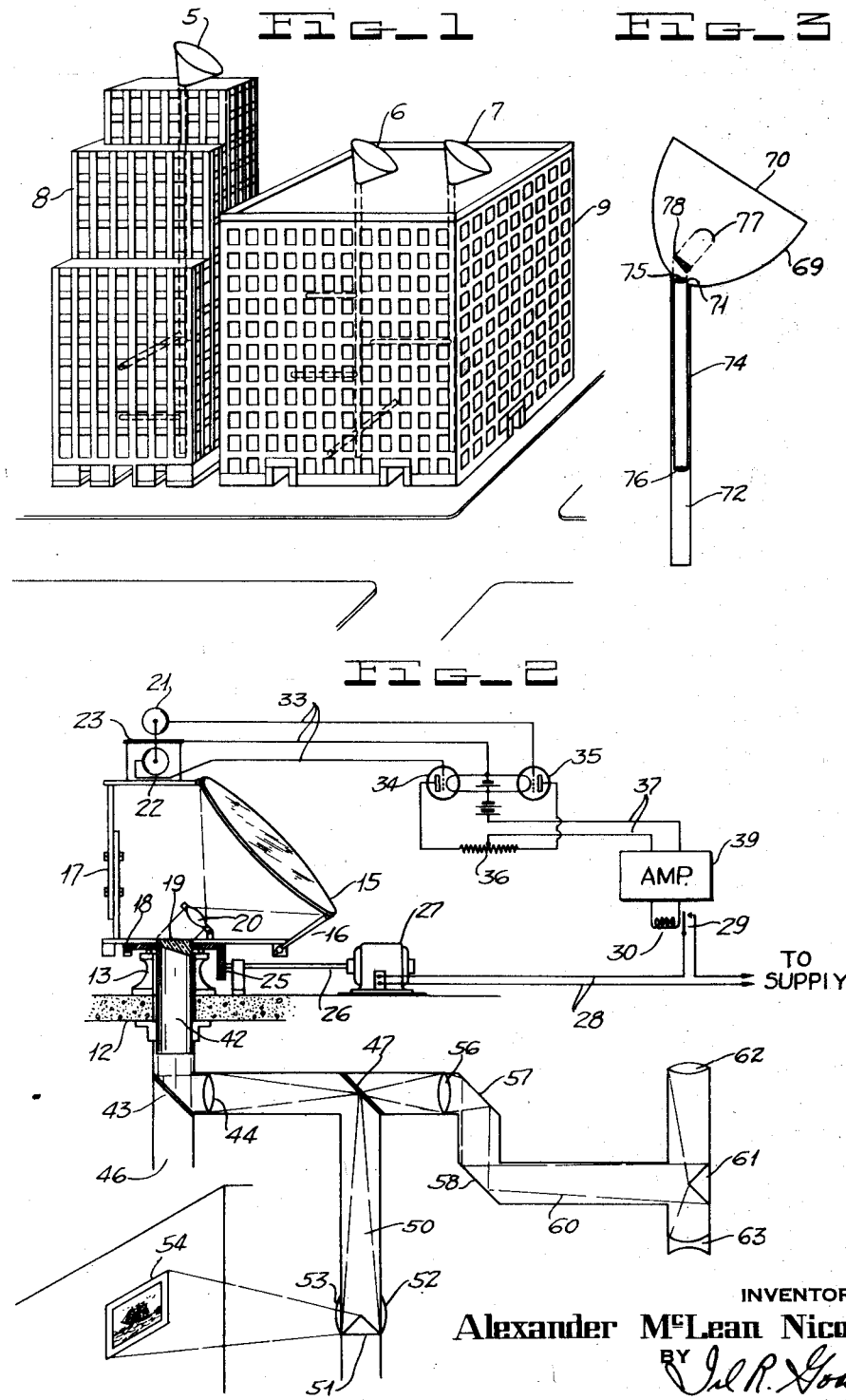
INVENTOR
Alexander McLean Nicolson
BY
ATTORNEY Patented Nov. 26, 1935

2,022,144

UNITED STATES PATENT OFFICE 2,022,144

LIGHT CONDITIONING AND DISTRIBUTION SYSTEM

Alexander McLean Nicolson, New York, N. Y., assignor to Communication Patents, Inc., New York, N. Y., a corporation of Delaware Application May 28, 1932, Serial No. 614,273

6 Claims. (Cl. 88—25)

This invention relates to light projection systems and particularly to systems for collecting sunlight and distributing same to places where direct sunlight is not available.

An object of the invention is to furnish light to dark enclosures.

Another object of the invention is to illuminate with direct sunlight certain objects within enclosures.

A further object of the invention is to control a sunlight collector to permit its functioning at optimum efficiency.

A still further object of the invention is to efficiently distribute collected sunlight to desired points.

The present trend of construction of office buildings, apartment houses and the like, is of a type which excludes from certain spaces therein direct sunlight, these spaces depending at all times upon artificial lighting for proper illumination. In many of the crowded sections of large cities, it is more economical to build upward than sideward, with the result that direct sunlight is excluded from much of the interior of the buildings. For instance, restaurants and other gathering places are on the lower floors of buildings near the ground from which sunlight is excluded by the adjoining buildings.

The present invention, in brief, contemplates apparatus for gathering sunlight and distributing it to the spaces within a building where direct sunlight never reaches. The outlets of the light distributing channels may be from the ceiling, floors, or walls of the rooms, and arranged for projection on objects which are desired to be emphasized in an interior decorating scheme. The invention embodies several important features such as an automatic directing system which follows the path of the sun to more efficiently gather the rays. The collecting system may be of several types but preferably a large concentrating lens of quartz or glass, directed toward the sun which will pass substantially all of the light frequencies. The other collecting modifications are a parabolic reflector and a funnel shaped device which placed at a definite angle, concentrate the light into the main distributing channel by reflection. The light channels may comprise hollow openings with total or partial reflecting mediums for changing and dividing the light beams. To further increase the efficiency of the distributing channels they may include evacuated tubes having lenses at the ends thereof to diminish the loss caused by absorption and to decrease any hazards caused by overheating.

Another feature of the system is the use of light filters which may condition the sunlight for certain purposes. The invention also contemplates the association of such a light distribution system with an air conditioning system in which the air is passed along a concentrated light beam for the destruction of harmful bacteria.

The invention will be more fully understood from the following description, taken in conjunction with the accompanying drawing, in which:

Fig. 1 is a perspective view of modern office or apartment buildings with one type of collector installed therein;

Fig. 2 is a diagrammatic view of a lens collecting system with the circuit arrangement of an automatic director for the lens; and Fig. 3 is a detailed view of another modification of a light collecting device.

Referring specifically to Fig. 1, light collectors 5, 6, and 7 which may be either of the type shown in Fig. 2 or Fig. 3 are mounted upon the highest point of buildings 8 and 9, which may represent ship structures, or hospitals, apartment or office buildings, or schools. Building 8 has been shown with the modern type of set back for lighting purposes, while building 9 is of the block type apartment house. By the aid of dotted lines, the light distribution channels are shown branching through the buildings to the different floors.

The light collectors 5, 6, and 7 are of the simple type of reflector combining efficiency and economy. As long as the sides of the collector make an angle of not more than 45° and the axis of the funnel is coincident with the axis of the channel, a large proportion of the light falling within the opening will be directed into the channel. The funnel may be tilted as shown, however, for better directive effects while the control system of Fig. 2 may be associated therewith. It is especially desirable in this type of collector to have the narrow portion as large as possible with respect to the opening.

In Fig. 2, roof structure 12 is shown having an opening 42 therein, around which there is a mounting 13. Upon the mounting 13 is a rotatable structure including a lens 15, its adjustable mounting supports 16 and 17, an annular rack 18, a deflecting prism 19, and a lens 20. Mounted upon this structure is a battery of two photoelectric cells 21 and 22, facing in opposite directions with a partition 23 therebetween. The mounting of the cells 21 and 22 is actually in a horizontal plane with the division 23 in a vertical position, but is shown in a plane at right angles to the proper plane for purposes of explanation. The rack 18 meshes with a pinion 25 on the end of a shaft 26 driven by motor 27. The motor 27 is energized over conductors 28 from the usual house lighting supply, the switch therefore being a contact 29 of a relay 30.

The remainder of the photocell circuit comprises three conductors 33, connected to the grids of push pull amplifier tubes 34 and 35. That is, cell 21 actuates tube 35 while cell 22 actuates tube 34, either tube operating the relay 30. The anodes of the tubes 34 and 35 are connected through an output impedance 36 over a common circuit 37 back to the filaments of the tubes. The output circuit 37 feeds an amplifier 39 for energizing the relay 30 and operating the contact 29.

The operation of the photocell circuit is as follows. When the lens 15 is in its optimum position, that is, with its axis coincident with a line toward the sun, neither photocell has any light falling thereon because one has its light sensitive material away from the sun and the other is in the shadow of the shield 23. However, as the sun shifts and one of the cells becomes actuated by sunlight it will close the relay 29 and start the motor which revolves the lens until the shield 23 places the energized cell in its shadow stopping the motor. This action will continue as the sun travels across the horizon until it disappears at which time both cells will become inactive and the lens structure will remain stationary during the night. In the morning, however, when the sun rises and the other cell becomes active, the motor will revolve the lens structure through the necessary angle until both cells are in the shadow. The cells are adjusted with respect to each other, the lens, and the position of the sun to provide the above action.

Referring to the light distributing system itself, the parallel light rays collected by the lens 15 are concentrated on the lens 20 and then on the prism 19 which deflects the parallel rays downwards through the opening 42 to a partial reflector 43. This reflector may be a partially silvered mirror of any desired type from which a part of the sunlight is reflected to a double convex lens 44 while the remainder continues downward through a channel 46. The light from the lens 44 is projected through another partial reflector 47 at which point it may be divided in any ratio whatsoever depending upon the reflecting qualities of reflector 47. Part of these light rays are directed downward through a channel 50 to a total reflecting dividing prism 51 from which it may be projected in either direction through planar convex lenses 52 and 53 for scattering the light in the space adjoining these openings. In the case of lens 53 it will be noticed that the light is projected upon a picture 54 which may be on the wall of the room. In this manner direct lighting of paintings and statuary may be accomplished which will invariably enhance the beauty of the room.

The light passing through the partial reflector 47 may be gathered by another lens 56 and projected upon a total reflecting surface 57 from which it passes downwards to another total reflecting surface 58 and along the horizontal passage 60 to a total reflecting dividing prism 61 similar to the prism 51 in channel 50. This arrangement illustrates the manner in which the light beam may be shifted along a horizontal course to avoid obstructions.

The prism 61 projects light upward through a double convex lens 62 which may be positioned in the floor of a room while the other half of the beam on prism 61 is projected downward through a double concave lens to produce the effect of the usual incandescent artificial lights. These various light channels are shown to illustrate how the light channels may follow through the partitions and floors of the building with reflectors and lenses. Especially is this true in the case where narrow restrictions are encountered and in which it is necessary to use double convex lens to concentrate the beam at the restricted points. The channels may be solely the dead spaces between walls or may be pipes or boxes built therein for the purpose. These channels may also serve as air passages for ventilating systems in which the air is purified by the sunlight and caused to circulate by the heating thereof.

In Fig. 3 another type of reflector having a greater efficiency than that of Fig. 1 is shown with a parabolic section 69 having a large opening 70 and a small opening 71 connected to a vertical channel section 72. A second reflector 77 placed just back of the focus of reflector 69 projects parallel rays on a deflecting prism 78 after which they follow the channel 72 in the same manner as in Fig. 2. To improve the efficiency of the light transmission within the building, evacuated tubes 74 with closing lenses 75 and 76 at the ends thereof may be employed where long straight sections are encountered. With such a section there is practically no loss due to absorption.

It is also possible with distributing systems of the above type of construction to condition the light for definite purposes. That is, a quartz lens 15 will permit practically all the light frequencies projected from the sun to be present in channel 42 and then by the aid of light filters, these light frequencies may be proportioned as distributed to the different spaces within the building. Furthermore, it is possible to project sunlight upon plaques, pictures, or statuary covered with a phosphorescent material which will absorb sunlight during the day to such an extent that at night these ornaments will incandesce when darkness arrives. A very novel lighting, protective, and decorative arrangement may thus be obtained by employing such systems.

Many advantages of such a light distribution system will occur to those skilled in the art and especially to engineers and construction engineers of large buildings containing living or working quarters which now require artificial light continuously. Furthermore, buildings designed to employ such systems may be more economical by conserving space. The system is also applicable to other sources of light and heat such as furnaces from which radiations can be distributed to needed places. It is to be understood, however, that these modifications of the illustrated system are intended to be within the scope of the appended claims.

What is claimed is:

1. In a light collecting and distributing system, a hollow conical shaped collector having its large opening directed toward a light source and its small opening connected with a hollow channel, means for directing said rays into said channel, a plurality of branch channels connected to said main channel, means for proportioning the light through said branch channels, said means consisting of partial reflectors, and means for concentrating said beam to a smaller cross section in said channel, said means including a plurality of lenses.

2. In a light collecting system, a hollow paraboloid having a reflecting interior, a second reflector positioned within said paraboloid adjacent the focus thereof, an opening in the apex of said paraboloid, said paraboloid and reflector being so positioned as to direct light falling on the interior of said paraboloid through the opening at said apex, means for maintaining parallelism of said rays, means for directing said parallel rays into a channel, a plurality of branch channels, and means for proportioning said rays in said channels.

3. In a light collecting system, a concentrating lens, means for adjusting said lens toward a source of visible and invisible light, means for creating parallelism of said concentrated beam, means for shifting said beam into a main distributing channel, means for dividing said beam into different proportions of light intensity in branch channels, means for dividing said light into different parts on the basis of frequency, means for varying the cross section of said light beam, and means at the terminals of said branch channels for directing all of said light on a light absorbing element adjacent said terminals.

4. In a light collecting system for buildings and the like, a lens directed toward the sun, means for concentrating visible and invisible rays into a parallel beam, means for projecting said beam through openings in said buildings between the rooms thereof, means for dividing said beam into different proportions in accordance with the spaces to be illuminated, means for separating various rays in said beam, means for concentrating said beam through constricted spaces between said walls, and means for projecting said rays through various openings.

5. In a light collecting and distributing system, means directed at a source of light for concentrating said light into a parallel beam of small cross section, means for directing said beam into said channels for illumination purposes, means for proportioning said light in said channels in accordance with the spaces to be illuminated, a plurality of light sensitive means mounted upon said structure, a motor for turning said structure, means for actuating said motor connected to said light sensitive means, and means for controlling the actuation of said light sensitive means in accordance with the position of said light source for operating said motor.

6. In a light collecting and distributing system, a large collecting lens, a concentrating lens cooperating with said large lens for obtaining parallel rays of small cross section, an adjustable supporting structure for said lenses, means for turning said supporting structure to maintain its directive position with respect to a relatively moving light source, a plurality of photoelectric units mounted upon said structure and adapted to rotate therewith, a motor for rotating said structure, means controlled by said photoelectric units for operating said motor, and means controlling the actuation of said photoelectric units in accordance with the position of said light source for adjusting said lens to the desired position.

ALEXANDER McLEAN NICOLSON.